(12) United States Patent
Wolleschensky et al.

(10) Patent No.: US 7,411,166 B2
(45) Date of Patent: Aug. 12, 2008

(54) ARRANGEMENT FOR OPTIMIZING THE PULSE SHAPE IN A LASER SCANNING MICROSCOPE

(75) Inventors: Ralf Wolleschensky, Schoeten (DE); Thomas Feurer, Jena (DE); Roland Sauerbrey, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 71 days.

(21) Appl. No.: 11/405,908

(22) Filed: Apr. 18, 2006

(65) Prior Publication Data

US 2006/0186327 A1    Aug. 24, 2006

Related U.S. Application Data

(63) Continuation of application No. 10/916,813, filed on Aug. 12, 2004, now abandoned.

(51) Int. Cl.
    *G02B 7/04* (2006.01)

(52) U.S. Cl. .................................. 250/201.3; 250/216
(58) Field of Classification Search ................ 250/226, 250/216, 235, 214.1, 239, 201.3, 306, 307; 359/239, 244, 39, 247; 372/25, 96, 109; 356/301

See application file for complete search history.

(56) References Cited

U.S. PATENT DOCUMENTS

| 5,414,540 | A  | * | 5/1995 | Patel et al. | 349/196 |
| 6,327,068 | B1 | * | 12/2001 | Silberberg et al. | 359/239 |
| 7,105,811 | B2 | * | 9/2006 | Dantus et al. | 250/288 |

\* cited by examiner

*Primary Examiner*—Que T Le
(74) *Attorney, Agent, or Firm*—Reed Smith LLP

(57) ABSTRACT

A Device for coupling a short pulse laser into a microscope beam path, wherein the spectral components of the laser radiation are spatially separated by means of a dispersive element, the individual spectral components are manipulated and are then spatially superimposed again by means of another dispersive element.

17 Claims, 3 Drawing Sheets

ARRANGEMENT FOR OPTIMIZING THE PULSE SHAPE IN A LASER SCANNING MICROSCOPE

CROSS REFERENCE TO RELATED APPLICATION

This application is a Continuation of U.S. patent application Ser. No. 10/916,813, filed Aug. 12, 2004, now abandoned the entire disclosure of which is hereby incorporated by reference.

BACKGROUND OF THE INVENTION a) Filed of Invention

At present, nonlinear contrasts such as two-photon absorption or second harmonic generation (SHG) are used to an increasing extent in microscopy, e.g., for examination of biological preparations. It is advantageous to use short pulse lasers to provide the energy needed to excite nonlinear effects. In this connection, the peak pulse power should be as high as possible and the pulse length at the location of the specimen should accordingly be as small as possible to prevent damage to the preparation simultaneously. Short pulse lasers supply light pulses, for example, of several 10 fs at a repetition rate of several 10 MHz. Accordingly, they have the advantage that they emit extremely high peak pulse energies accompanied at the same time by low average output.

It is disadvantageous that the short pulses on the path through the microscope to the specimen change due to the group velocity dispersion (GVD)—usually, they become longer.

b) Description of the Related Art

In order to compensate for pulse lengthening, corresponding changes (prechirp devices) have been suggested (DE 19622353). Further, adaptive optics have been provided in DE 19733193. The described devices are suitable for compensation of second-order dispersion.

However, higher-order dispersions which cannot be determined beforehand must be taken into account, e.g., in biological preparations. Further, higher-order dispersions occur in the optical components in a microscope. Therefore, it is not possible to create optimum conditions for the excitation of nonlinear contrasts by conventional techniques.

In conventional fluorescence microscopy, different dyes are used for specific tagging of biological preparations. These dyes are subsequently excited by different light wavelengths. In preparations of this kind, simultaneous excitation of the various dyes is usually carried out using multiphoton excitation. On the one hand, this is advantageous because only one light wavelength is needed for excitation. On the other hand, it is disadvantageous when the emission wavelength bands of the individual dyes overlap because the dyes can then no longer be spectrally separated.

OBJECT AND SUMMARY OF THE INVENTION

It is the primary object of the invention to overcome the above described disadvantages.

In accordance with the invention, a device for coupling a short laser into a microscope beam comprises a dispersive element for spatially separating the spectral components of the laser radiation, means for manipulating individual spectral components and another dispersive element for spatially superimposing the manipulated individual spectral components.

DESCRIPTION OF THE PREFERRED EMBODIMENTS

Figure 1:
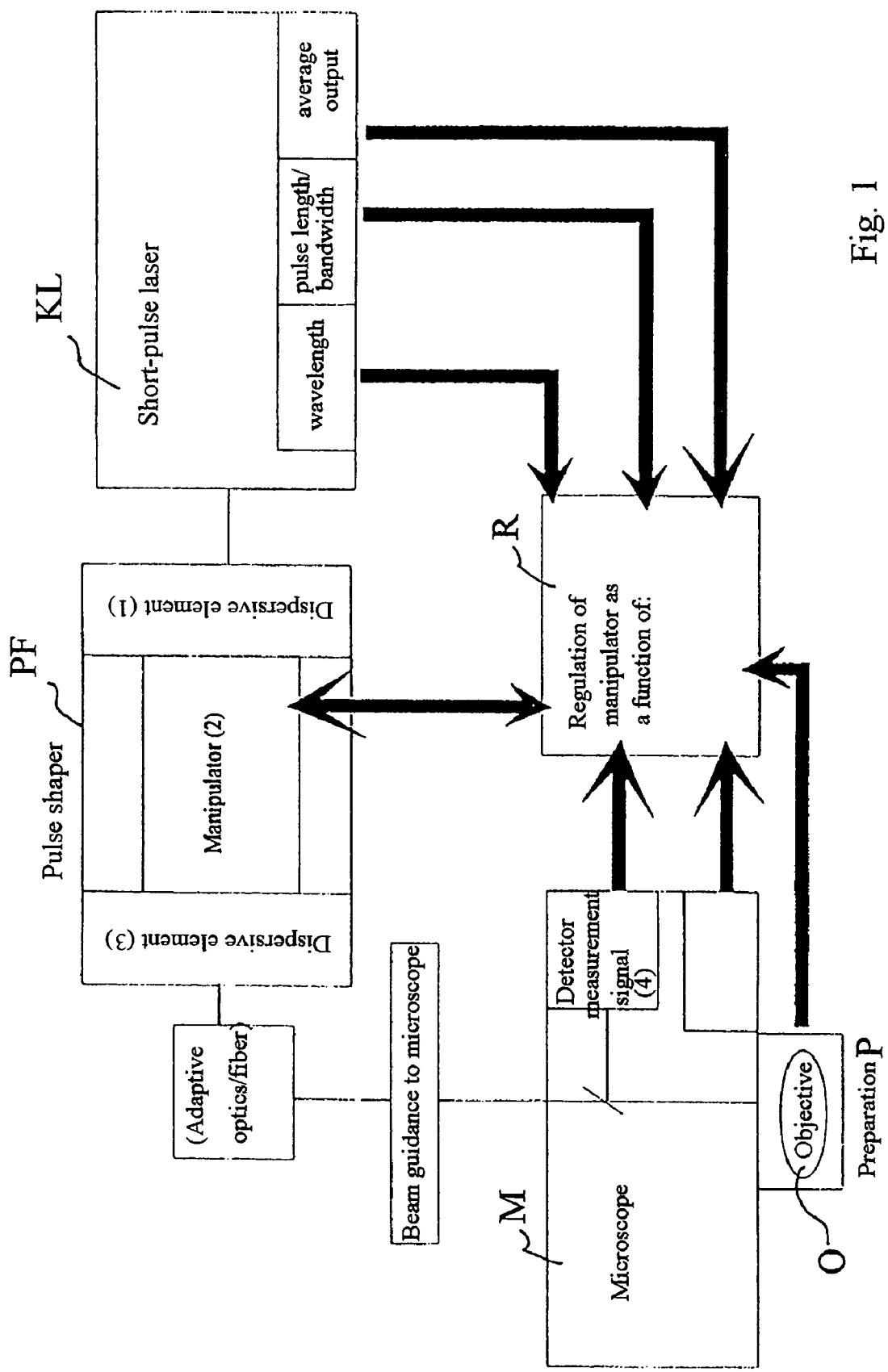
FIG. 1 is a block diagram of the arrangement in accordance with the invention.
Figure 2:
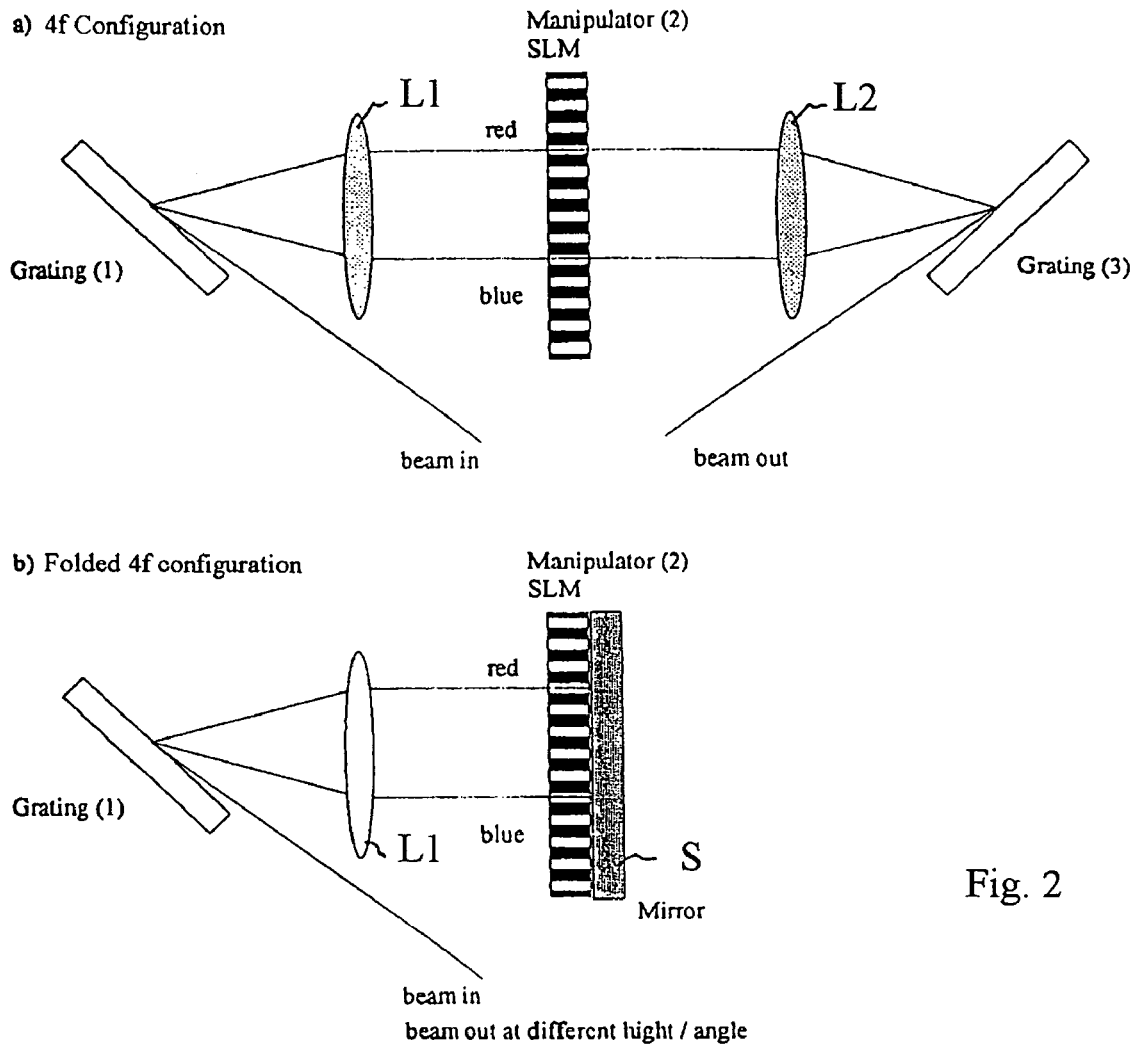
FIG. 2a is a schematic representation of a 4f system.
FIG. 2b is a schematic representation of a folded 4f system.

The light pulses proceed from the short pulse laser KL to the pulse shaper PF. The latter is shown schematically in FIG. 2a. In the pulse shaper PF, the incident beam (beam in) is spatially split into the spectral components of the light pulses in a first dispersive element (1) comprising, e.g., a grating or prisms. A Fourier plane is then generated by means of an achromatically corrected lens or lens group L1 (FIG. 2).

This plane (focal plane) is characterized in that the individual spectral components of the light pulses are spatially separated. Considered mathematically, the transformation into this plane corresponds to a Fourier transform. In this plane, a spatial light modulator (2) (SLM) is used in transmission. The modulator is also referred to herein as a manipulator of spectral components. Generally, it comprises a matrix of nematic liquid crystals (e.g., SLM-S160/h, Jenoptik LOS) in helical or parallel arrangement. The transmission and phase displacement of the corresponding spectral components can be adjusted by a corresponding electronic arrangement of the individual points of the matrix. The spatial separation of the spectral components of the light pulses is then canceled by a second identical lens L2 and a second dispersive element (3) (beam out) identical to the first dispersive element. This process corresponds to the inverse transform in the time domain. Therefore, the time behavior of the light pulses can be controlled by means of phase modulation or amplitude modulation. The arrangement of 2 gratings and 2 lenses is known from the literature as a 4f system.

A simplified arrangement for the pulse shaper is shown in FIG. 2b. In this case, a mirror S is arranged right after the modulator (2) so that the beam runs back into itself with a small vertical offset or at a small angle. First, this arrangement makes do with few optical components; second, the light pulses traverse the modulator (2) twice, so that the magnitude of the phase/amplitude modulation is doubled.

Figure 3:
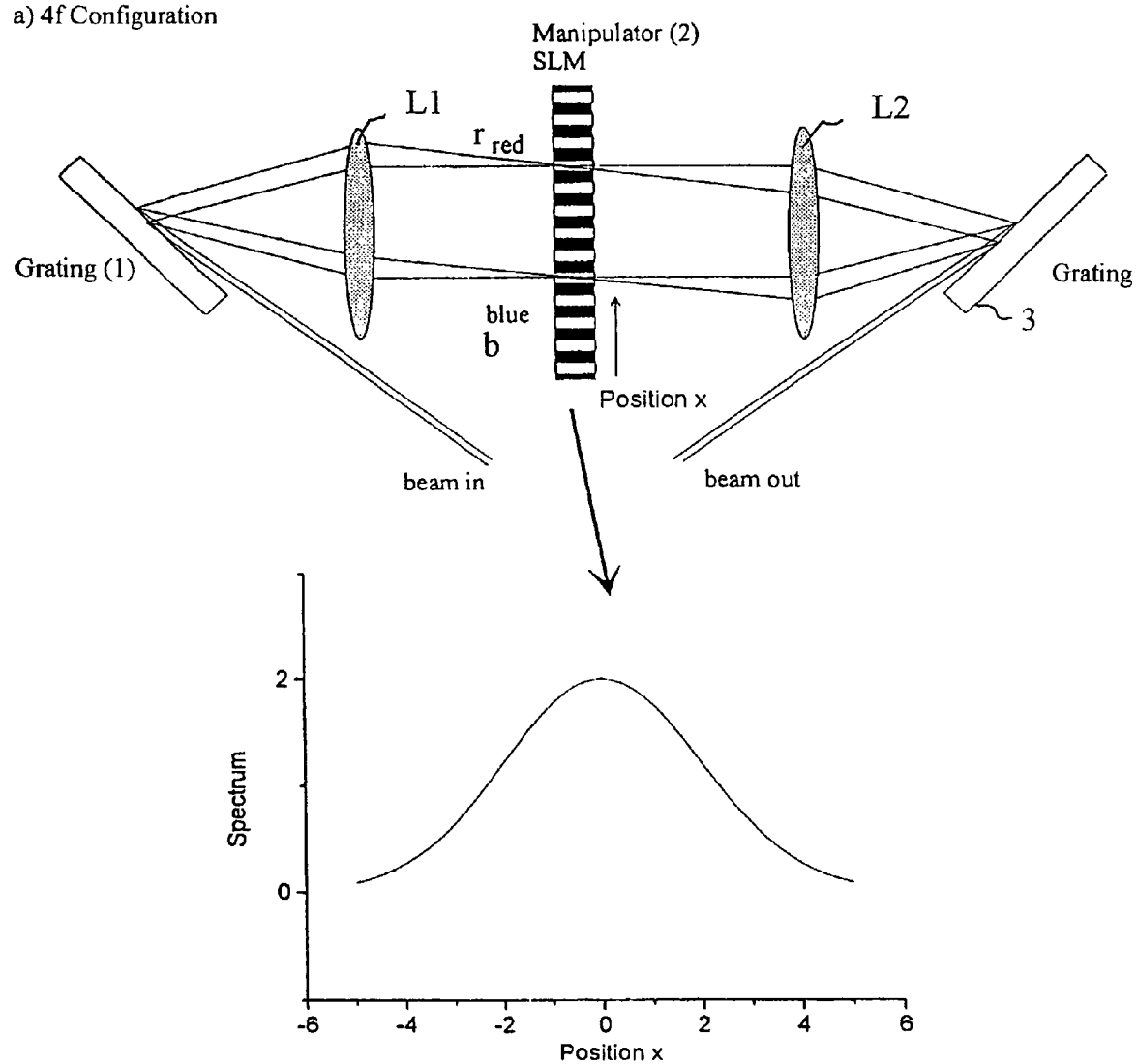
FIG. 3 shows schematically the dispersive splitting and continuation of a red component r and a blue component b passing the manipulator and the wavelength shape along a direction x to the manipulator.

FIG. 3 shows schematically the dispersive splitting and combination of a red component r and a blue component b passing the manipulator 2 and the wavelength shape along a direction X to the manipulator 2.

Since the time behavior can be changed in the pulse shaper, the light pulses pass via corresponding optical components via the microscope M and the objective V into the specimen P. A nonlinear effect is excited in the specimen P because of the sharp focussing through the objective and the high peak pulse power of the light pulses. This nonlinear effect is recorded by the detector (4). Therefore, a corresponding measurement signal is available that can be optimized by electronically controlling the pulse shaper by means of regulation R.

The operation of the regulation will be described by way of example of generation of a two-photon fluorescence signal.

The two-photon fluorescence signal (S) can be described as follows:

$$S \propto \frac{P_{avg}^2}{T^2 \cdot A^2},$$

where $P_{avg}$ is the average output and T is the pulse length of the light pulses at the location of the specimen. A stands for the beam cross section at the location of the specimen interaction.

It can be seen from the above equation that the two-photon fluorescence signal increases as the pulse length and beam cross section decrease and as average output increases. In a microscope, the pulse length is influenced, i.e., usually lengthened, by the following factors:

- the glass materials from which the optical elements in the microscope are made; compensation can be carried out in a stationary manner;
- the specimen in itself; in this case, the lengthening of the pulse depends upon the depth of penetration into the specimen; further, the pulse widening is generated by higher-order dispersions; therefore, compensation must be carried out for every spectral component individually and in real time;
- change in wavelength;
- change in average output.

The pulse shaper PF, and accordingly the time behavior of the light pulses, is therefore adjusted by regulation in real time depending on the above-mentioned variables, wherein the two-photon fluorescence signal functions as a measured quantity. Essentially the pulse length and the average output at the location of specimen interaction are optimized by the pulse shaper.

Further, the interaction cross sections of the utilized dyes are dependent on the time behavior of the light pulses. Accordingly, it is possible to optimize the fluorescence signal for individual dyes, wherein the fluorescence of other dyes is simultaneously suppressed. This is known in the literature as coherent control. Thus, by feeding back the measured quantity (in this case, the two-photon fluorescence signal), it is possible to adjust the time behavior of the light pulses by phase modulation or amplitude modulation in such a way that the corresponding measured quantity is optimized.

While the foregoing description and drawings represent the preferred embodiments of the present invention, it will be obvious to one skilled in the art that various changes and modifications may be made therein without departing from the true spirit and scope of the present invention.

The invention claimed is:

1. A device for coupling a short pulse laser into a microscope beam path of a laser scanning microscope comprising:
   a dispersive element for spatially separating the spectral components of the short pulse laser;
   a manipulator for manipulating individual spectral components; and
   an element for cancelling the spatial separation of the spectral components;
   wherein the microscope generates a nonlinear effect, and a measured quantity of the nonlinear effect is fed back to the manipulator to enable the manipulator to purposefully optimize the measured quantity.

2. The device according to claim 1, wherein, after manipulation, the spectral components are reflected at a mirror and the spatial separation of the spectral components is cancelled by the first dispersive element.

3. The device according to claim 1, wherein the microscope is a laser scanning microscope.

4. The device according to claim 1, wherein prisms or gratings are used as dispersive elements.

5. The device according to claim 1, wherein the manipulator generates an amplitude modulation of the spectral components.

6. The device according to claim 1, wherein the manipulator generates a phase modulation of the spectral components.

7. The device according to claim 1, wherein the manipulator is a spatial light modulator.

8. The device according to claim 6, wherein the phase modulation compensates for higher order dispersion.

9. The device according to claim 6, wherein the phase modulation optimizes the measured quantity by being adjusted based on the average measured quantity fed back to the manipulator.

10. The device according to claim 6, wherein the phase modulation optimizes the measured quantity by being adjusted based on the depth of penetration into a specimen being examined.

11. The device according to claim 1, wherein the manipulator optimizes a fluorescence signal for an individual dye while simultaneously suppressing the fluorescence of other dyes, wherein the dyes are used for specific tagging of a biological preparation.

12. The device according to claim 11, wherein the manipulator optimizes the fluorescence signal by phase or amplitude modulation.

13. A laser scanning microscope system comprising:
    a microscope;
    a dispersive element for spatially separating the spectral components of a short pulse laser that will be coupled into a microscope beam path of the microscope;
    a manipulator for manipulating individual spectral components; and
    an element for cancelling the spatial separation of the spectral components;
    wherein the microscope generates a nonlinear effect, and a measured quantity of the nonlinear effect is fed back to the manipulator to enable the manipulator to purposefully optimize the measured quantity.

14. The device according to claim 1, wherein the element for cancelling the spatial separation of the spectral components is the dispersive element.

15. The device according to claim 1, wherein the element for cancelling the spatial separation of the spectral components comprises a second dispersive element.

16. The device according to claim 1, wherein the device further comprises a lens or lens group for receiving the separated spectral components and generating a Fourier transform.

17. The device according to claim 15, wherein the element for cancelling the spatial separation of the spectral components further comprises a second lens or lens group.

* * * * *